L. R. BALL.
HAT FASTENER.
APPLICATION FILED JUNE 11, 1908. RENEWED JUNE 11, 1914.
1,124,385.
Patented Jan. 12, 1915.
3 SHEETS—SHEET 1.
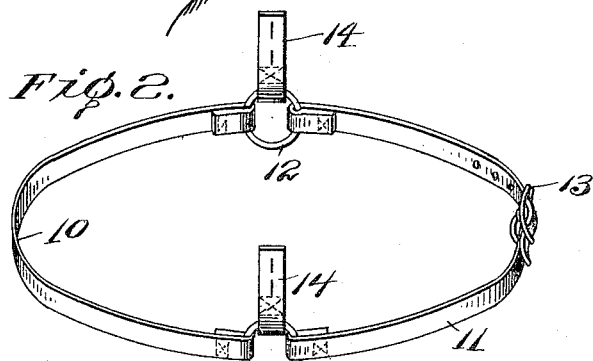
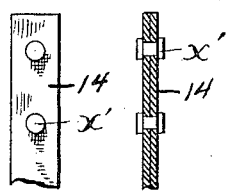 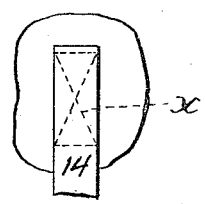 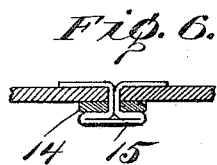

L. R. BALL.
HAT FASTENER.
APPLICATION FILED JUNE 11, 1908. RENEWED JUNE 11, 1914.
1,124,385.
Patented Jan. 12, 1915.
3 SHEETS—SHEET 2.
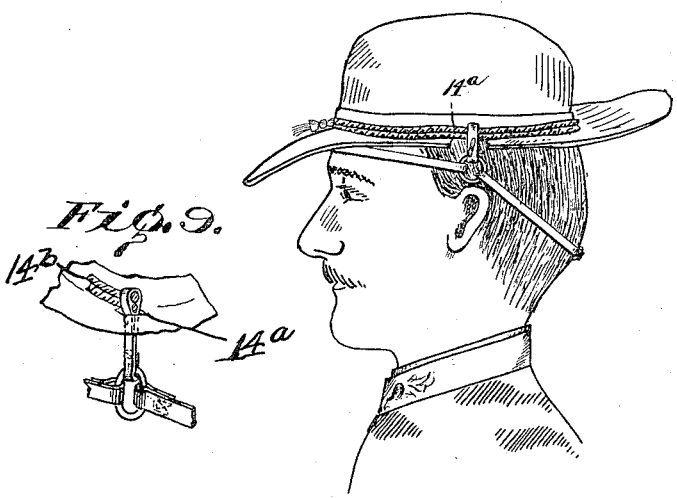
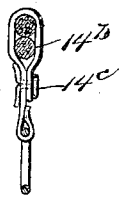
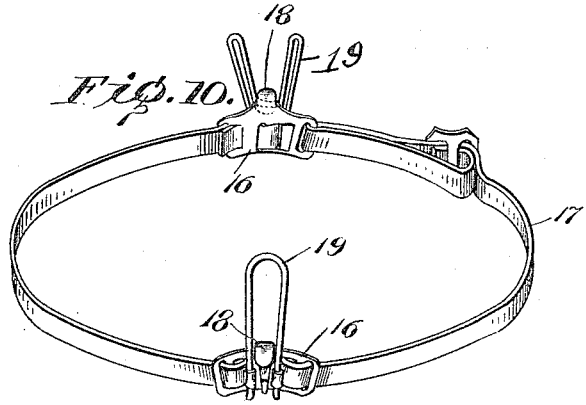
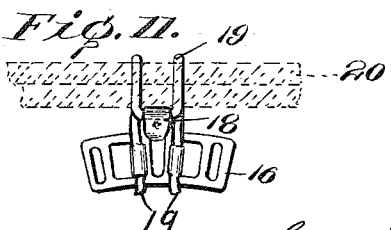

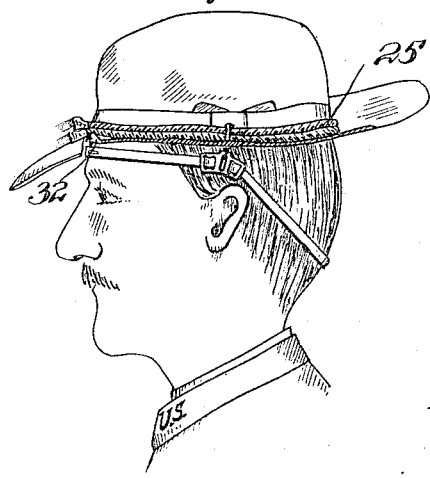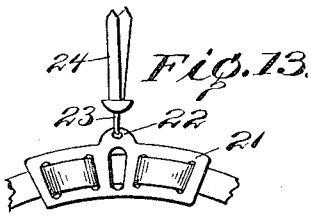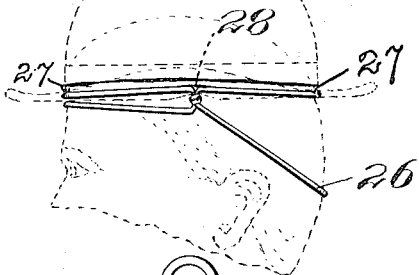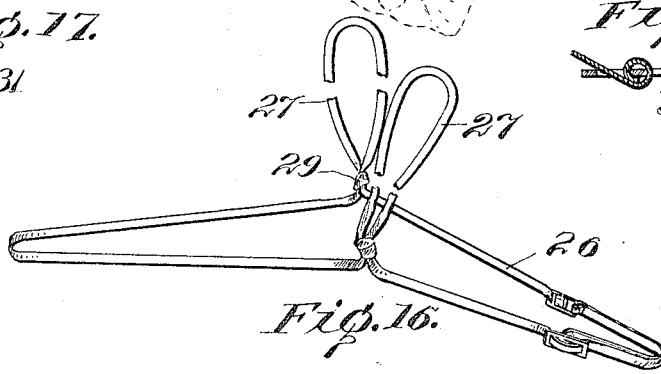

UNITED STATES PATENT OFFICE.

LOUIS R. BALL, OF THE UNITED STATES ARMY.

HAT-FASTENER.

1,124,385.  Specification of Letters Patent.  Patented Jan. 12, 1915.

Application filed June 11, 1908, Serial No. 437,985. Renewed June 11, 1914. Serial No. 844,583.

*To all whom it may concern:*

Be it known that I, LOUIS R. BALL, a citizen of the United States of America, and a lieutenant in the United States Army, stationed at the University of the State of Florida, Gainesville, in the county of Alachua, Florida, have invented certain new and useful Improvements in Hat-Fasteners, of which the following is a specification.

This invention relates to hat fasteners and has relation more particularly to a device designed to frictionally engage the head of the wearer, said device being attached to a hat by any suitable means which will permit movement of the front and rear portions of the hat securing device.

The principal object of this invention is to provide a device which is designed to frictionally engage the front and back portions of the head of the wearer, in which any pull on the head engaging device will result in increasing the frictional engagement of the device with the head and to that end it is preferable that the device be made so that the front and rear portions thereof may stand at an angle with relation to each other in order that any pull on the fastening device will result in changing the angle of the portions by making said angle more acute.

The invention consists primarily, as stated, in the production of a frictionally retained hat securing device, but the invention further contemplates the provision of novel means for attaching the hat securing device to the hat through novel means which will permit the fastening device to be applied to or removed from the hat.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a side elevation, partly in section of a hat provided with a fastening means constructed and arranged in accordance with the invention; Fig. 2, is a detail view of the fastener, detached; Fig. 3, is a view in elevation, showing the rivets for attaching the fastener to a hat; Fig. 4, is a sectional view thereof; Fig. 5, is an elevation of a modification; Fig. 6, illustrates a fastening means usually employed in connection with the device shown in Fig. 1; Fig. 7, is a view similar to Fig. 1, showing a modified means of attaching the hat encircling device to a hat; Fig. 8, is an enlarged detail view of the means for attaching the head encircling device to a hat, shown in Fig. 7; Fig. 9, is a perspective view of the same part of the invention; Fig. 10, is a perspective view of a further modified head encircling device and means for attaching the same to a hat; Fig. 11, is a detail view of a plate utilized in connection with the disclosure in Fig. 10, showing the means of connecting the plate to cords adapted to encircle a hat; Fig. 12, is a view similar to Fig. 1, illustrating a still further modification of the head encircling device and means for attaching it to a hat; Fig. 13, is a detail view showing a plate with means for attaching it to a hat; Fig. 14, illustrates the invention in a still further modified form; Fig. 15, is a detail view showing the means for adjusting the head encircling device shown in Fig. 14; Fig. 16, is a perspective view of the hat securing device shown in Fig. 14, before being applied to a hat; and Fig. 17, is a detail view of a means for attaching the front of the hat encircling device to a hat.

In these drawings the fastener or retainer comprises a strap or band 10, that is arranged to extend around the forehead, and a second strap or band 11, that fits around the back of the head, the two straps being connected together at a point above the ears of the wearer, by means of a pair of side rings 12. The strap 11, is formed in two sections that are connected together by a buckle 13, of any ordinary type, in order to permit adjustment to suit the wearer. Connected to the upper portions of the two rings 12, are short straps or bands 14, which are connected to the sides of the hat and any suitable form of securing means may be employed for this purpose.

In practice, the inner sweat-band of the hat is ripped away from the inner side of the hat or a short distance on each side and the short straps or bands 14, are passed up between the sweat-band and the hat proper and then secured to the hat by means of metallic clips 15, of the type shown in Fig. 6, this forming a ready means for attaching the fastener and at the same time permitting removal when the retaining device is undesirable as for instance when the hat is worn off duty. The straps 14, may, however, be fastened in place by stitching as indicated at x, in Fig. 5, or rivets x', may be employed as shown in Fig. 4, in order to form a permanent connection, although the detachable connection is usually preferred.

While the description thus far deals with a hat fastener comprising a strap or band arranged to extend around the forehead and a second strap or band that fits around the back of the head and means for connecting the said straps together and to the head of the wearer, it is to be understood that this invention is not limited by details of construction of the head encircling device as it has been found in practice that the head encircling device heretofore referred to as the straps 10 or 11, may be variously modified and that a single strap, band, cord or the like may be utilized to encircle the head and to that end the term "head encircling device" or "head engaging device" will be used hereafter to indicate and it is understood to mean any device which is made up of several sections suitably connected, or a single member for encircling the head adapted to engage the front and back of the head and for the purpose of further defining what is meant by the terms employed in the specification, it is to be understood that the term "front portion" and the term "back portion" of the device applied to the head will mean the parts, portions, sections or members which respectively engage the front and back of the head regardless of whether there is a plurality of parts or a single piece of material encircling the head.

As a modification of the device just described, I may fasten the straps or bands 14, to the hat, by making the apertures 14ª, in the brim of the hat and running the straps or bands therethrough and over the cords 14ᵇ, or other similar ornaments in a hat and then reinserting the ends of the bands 14, in the apertures in the brim of the hat in order to cause the said ends of the straps or bands to project below the brim of the hat where the said ends are attached to the main portion of the straps or bands by means of rivets 14ᶜ, or other securing devices.

In the form shown in Fig. 10, the head engaging device is formed in a single piece provided with plates 16, at the sides thereof, one of said plates being utilized as a connection for the ends of the flexible head engaging device 17. The plates 16, have ears 18, which are bent to form hooks and said plates have loops 19, connected to them in any suitable manner, which loops are designed to extend through apertures in the brim of the hat, said loops being then extended around a cord 20, and through the apertures in the brim of the hat into engagement with the hooks. By removing the loops from the hooks, the head encircling device may be removed from the hat or it may be applied thereto in the simple manner indicated.

In the form shown in Fig. 12, the head encircling device is similar to that just described, but the means for attaching it to the hat is different and the difference consists in that the head encircling device has plates 21, provided with loops or eyes 22, which are engaged by the loop-engaging members 23, depending from the under surface of the brim of the hat. It is obvious that these loop engaging members may be in the form of hooks as shown, or they may be in the form of snap hooks or the like which will detachably secure the loops to the hat. The shanks of the loop engaging members 23, have flexible tongues 24, which are designed to be wrapped around the cords 25, of an army hat or the said tongues may be made to engage any other part of the hat by which they may be secured thereto. The construction of the head encircling device in this modification may be similar to the form shown in Figs. 1, 7 or 10, and will, therefore, not be described in detail.

As further illustrating the development of the invention and its practical application, I show in Fig. 14, a head encircling device 26, having integral loops 27, adapted to be inserted in the apertures 28, in the brim of a hat the said loops being of flexible material which will yield sufficiently to permit the said loops to be passed down over the crown of the hat. The knots 29, at the junction of the head encircling device and loops act as stops to limit the movement of the loops in the apertures of the brim. Instead of forming knots 29, in the device, I may employ any suitable stops or retaining devices as substitutes therefor. The head encircling device is provided with an adjusting plate or buckle 30, through which the material forming the head encircling device is adjustable and it is to be understood that the size of the head encircling device may be changed by the adjustment of the material in the plate. In this form the material employed for forming the hat attachment may be elastic or it may be of any suitable material such as leather or cord, and in fact, I do not wish to be limited with respect to the materials utilized in the manufacture of these devices.

As shown in Fig. 17, I may provide a means for connecting the front portion of the head encircling member with the front of the hat and this may be accomplished in any suitable manner but for the purpose of showing one means for accomplishing the result, the hook 31, is utilized which penetrates the sweat-band 32, of a hat, said hook being connected to the front portion of the head encircling member as shown.

While I have described this invention as being attached to a hat at the sides thereof, it is to be understood that the attachment can be made at any points intermediately of the points of attachment which are illustrated and I do not wish to be limited with respect to the points or mode of attaching the head engaging device to the hat.

I claim—

1. A hat fastening device comprising front and rear parts for engaging the head of a user pivotally connected to each other at two points and a hat engaging member attached thereto at each pivotal point.

2. A hat fastener adapted to frictionally engage the forehead and back of the head of a wearer, the portion of the fastener adapted to engage the forehead and the portion of the fastener adapted to engage the back of the head being movable with relation to each other to permit adjustment of the portions at angles to each other and means for detachably attaching the fastener to a hat.

In testimony whereof I affix my signature in the presence of two witnesses this 8th day of June, 1908.

LOUIS R. BALL.

Witnesses:
L. E. BARKLEY,
L. A. SANDS.